US009532021B2

(12) United States Patent
Kato

(10) Patent No.: US 9,532,021 B2
(45) Date of Patent: Dec. 27, 2016

(54) TRUE-COLOR ENVIRONMENT CORRECTION DEVICE AND TRUE-COLOR ENVIRONMENT CORRECTION METHOD

(71) Applicant: PAPALAB CO., LTD., Hamamatsu-shi, Shizuoka (JP)

(72) Inventor: Makoto Kato, Hamamatsu (JP)

(73) Assignee: PAPALAB CO., LTD., Hamamatsu-shi, Shizuoka (JP)

( * ) Notice: Subject to any disclaimer, the term of this patent is extended or adjusted under 35 U.S.C. 154(b) by 0 days.

(21) Appl. No.: 14/894,383

(22) PCT Filed: Mar. 19, 2015

(86) PCT No.: PCT/JP2015/001560
§ 371 (c)(1),
(2) Date: Nov. 27, 2015

(87) PCT Pub. No.: WO2015/141233
PCT Pub. Date: Sep. 24, 2015

(65) Prior Publication Data
US 2016/0127706 A1    May 5, 2016

(30) Foreign Application Priority Data
Mar. 19, 2014 (JP) ................................ 2014-055737

(51) Int. Cl.
*H04N 9/73* (2006.01)
*H04N 5/262* (2006.01)
(Continued)

(52) U.S. Cl.
CPC ............. *H04N 9/646* (2013.01); *G01J 3/2823* (2013.01); *G06T 11/001* (2013.01); *H04N 1/60* (2013.01);
(Continued)

(58) Field of Classification Search
USPC .......... 348/223.1, 222.1, 225.1, 231.99, 239, 348/655; 382/163, 164
See application file for complete search history.

(56) References Cited

U.S. PATENT DOCUMENTS 6,980,231 B1 * 12/2005 Ohsawa ............... H04N 1/6055
348/179
2009/0002517 A1 * 1/2009 Yokomitsu ......... G06K 9/00771
348/223.1
(Continued)

FOREIGN PATENT DOCUMENTS

JP        10-240800 A     9/1998
JP        11-168620 A     6/1999
(Continued)

*Primary Examiner* — Aung S Moe
*Assistant Examiner* — Euel Cowan
(74) *Attorney, Agent, or Firm* — Matthias Scholl, PC; Matthias Scholl

(57) ABSTRACT

An object is to accurately provide the user with color fidelity information irrespective of difference in the time of day when or in the location where a commercial product is photographed and prevent mismatching of the user's selection of the commercial product. A color fidelity environment correction system 1 includes a camera 2 and a computer 5 that is connectable with the camera 2, a tablet terminal 3 and a display device 4 and is configured to include a CPU, a ROM, a RAM, a hard disk drive and a bus line. A red vehicle 6 is photographed with the camera 2 (RC-500) in a plant or the like, and XYZ color fidelity images are recorded in a storage unit 51 of the computer 5. Another blue vehicle 7 is photographed with the tablet terminal 3 in the open air, and an RGB color image is stored in a storage unit 52. An RGB color image of the red color vehicle is created with replacement of the blue color of the RGB color image of the vehicle 7 with red color of the 3-band visual sensitivity images S1$i$, S2$i$ and S3$i$ of the vehicle 6 and is displayed on the display device 4 or is displayed with the RGB color image of the blue vehicle 7 in a comparative manner.

7 Claims, 15 Drawing Sheets

(51) Int. Cl.
*H04N 9/64* (2006.01)
*H04N 1/60* (2006.01)
*G01J 3/28* (2006.01)
*G06T 11/00* (2006.01)
*H04N 9/74* (2006.01)
*H04N 1/62* (2006.01)
*H04N 9/04* (2006.01)

(52) U.S. Cl.
CPC ............... *H04N 1/622* (2013.01); *H04N 9/04* (2013.01); *H04N 9/643* (2013.01); *H04N 9/735* (2013.01); *H04N 9/74* (2013.01)

(56) References Cited

U.S. PATENT DOCUMENTS

| | | | |
|---|---|---|---|
| 2011/0026821 A1* | 2/2011 | Edge | H04N 1/6052 382/167 |
| 2014/0055481 A1* | 2/2014 | Gao | G09G 5/02 345/589 |

FOREIGN PATENT DOCUMENTS

| | | |
|---|---|---|
| JP | 2001-258044 A | 9/2001 |
| JP | 2002-245372 A | 8/2002 |
| JP | 2004-328202 A | 11/2004 |
| JP | 2008-85975 A | 4/2008 |
| JP | 2011-211317 A | 10/2011 |

* cited by examiner image of vehicle that is object of color simulation is set in left frame.

color image of vehicle that is subjected to color extraction is set in right frame color simulation is performed to replace color of vehicle displayed in left frame with color of vehicle displayed in right frame.

TRUE-COLOR ENVIRONMENT CORRECTION DEVICE AND TRUE-COLOR ENVIRONMENT CORRECTION METHOD

TECHNICAL FIELD

The present invention relates to a color fidelity environment correction apparatus and a color fidelity environment correction method that allow for accurate simulation of the color of an object.

BACKGROUND ART

A technique has been proposed to provide an image processing method that visualizes image information and readily and naturally converts the color of a visualized image into a desired color. For example, in a photographed image including a person and the blue sky, specifying either the human or the blue sky as an object of color change narrows the changeable range of color to some extent. The changeable range of color is further narrowed according to the race of the subject person or the state of the sky. The user can thus select a desired color to be changed in the narrowed range of color. This proposed technique accordingly facilitates the user's selection of the color.

A proposed technique for providing a presentation on the basis of budget and form by taking into account beginners edits multimedia information input from an input device such as keyboard or scanner and stores image information and moving image information in the form of digital image and moving image, as well as audio information into an external storage device. An outline is selected according to the budget and the form, based on the stored information and is displayed in a display device via a processing device. History information is then read from a portable storage medium, and the contents of a previous specification and the contents of a current specification are displayed. A specification is selected from a selection screen and is settled with a presentation performed as necessary. After settlement of the specification, approximate estimation including assessment and computation based on the history information is performed. An order fulfillment is provided after approval of the approximate estimation.

CITATION LIST

Patent Literature

PTL 1: JP H11-168620A
PTL 2: JP H10-240800A

SUMMARY

Technical Problem

In sales of commercial products, for example, motor vehicles, several vehicles in specified colors may be actually placed as samples and the other colors may be shown as the colors of miniature cars, for the user's selection of the color of a vehicle. Another possible technique may photograph actual vehicles in various colors with a camera and display images of the vehicles photographed with the camera on a display device in a car dealer, for the user's selection of the color of a vehicle.

Various types of actual vehicles are unlikely to be placed in a car dealer, due to the limited space. In sales, there is a need to show the user in the car dealer the color of a vehicle that is not actually placed in the car dealer. In the case of sales based on image data of a vehicle taken in a different location or in a different time of day, the color of the image may be acceptable in some cases but may lead to mismatching due to the different time of day or the different location in other cases. For example, the color of an actually purchased vehicle may be different from the color of a vehicle shown in the car dealer. There is accordingly a need for accurate color simulation.

In another example, there is a demand for comparative examination between the color of a reference product produced domestically and photographed in a local environment and a product produced overseas in a remote location. The environment light (temperature) differs in Japan and overseas. There is accordingly a need for displaying a product in accurate color on the monitor screen under the overseas environment light. Especially there is a need to reduce the customer complaint that the color of a fashionable product, such as a cloth or article of furniture on an online shop is not accurate color.

With latest advancement of shopping on the Internet to allow for the user's selection of a commercial product on the screen, there is also a need to deal with the customer complaint that the color of an ordered commercial product is different from the color of an actually purchased commercial product.

For example, 3-band visual sensitivity image data, $S1$, $S2$ and $S3$ may be obtained by photographing a reference object with a visual sensitivity camera at a temperature of $T=6500$ K in a local location. The data may be sent to a remote location by a network. When the image of the reference object is displayed in a tablet terminal in the remote location, for example, under illumination of a fluorescent light at $T=5000$ K, the color of the image is likely to look differently, due to the color temperature difference of the environment.

An object of the invention is accordingly to provide a color fidelity environment correction apparatus and a color fidelity environment correction method that obtains accurate color information similar to the human visual sense in response to a request for obtaining and selecting accurate color information in simulation even under different environments and accurately display the user's desired color in simulation based on the obtained color information for the purpose of the user's selection of a commercial product.

Solution to Problem

One available technique for color replacement may apply a color created by a personal computer on CAD data and display the color applied on the CAD data on the screen. The displayed color, however, has the problem of lack of reality. This technique is not sufficient, due to various other circumstances of the car maker, for example, unwillingness to make three-dimensional CAD data of a vehicle open to public.

Another available technique may photograph actual vehicles in a plurality of different colors, store images of the vehicles in a computer and display the images on a display device for selection of the color of a vehicle. The color information reproduces the accurate color during photographing at the color temperature in a specific time of day, for example, under illumination of 6500 K in daytime. In the case where the time of day during selection of the color at a car dealer is different from the time of day during photographing, the color of the image may look differently according to the color temperature during photographing. This may result in mismatching of the user's selection of the color.

By taking into account the above problems, the invention provides a color fidelity environment correction apparatus and a color fidelity environment correction method that accurately provide the user with color fidelity information irrespective of difference in the time of day when or in the location where a commercial product is photographed and prevent mismatching of the user's selection of the commercial product.

The present invention provides a color fidelity environment correction apparatus, comprising: a camera that is configured to have three spectral sensitivities ($S_1(\lambda)$, $S_2(\lambda)$, $S_3(\lambda)$) linearly and equivalently converted from a CIE XYZ color matching function; a simulation image computation unit that is configured to obtain 3-band visual sensitivity images as a reference by photographing an object to be observed with the camera at a reference color temperature, calculate spectral sensitivities under a condition of a different color temperature from the reference color temperature, calculate gains of 3-band spectral sensitivities of the camera at the different color temperature, and adjust the gains based on color temperature, so as to correct the 3-band visual sensitivity images and compute tristimulus values X', Y' and Z' from the corrected 3-band visual sensitivity images; and a display device that is configured to display an RGB image taken at a different color temperature with replacement of color based on the corrected tristimulus values X', Y' and Z' or display the RGB image based on the corrected tristimulus values X', Y' and Z' and an RGB image taken at the different color temperature in a comparative manner.

It is preferable that the gains are adjusted according to a relational expression between wavelength of black body radiation and relative intensity of a spectrum at the color temperature.

It is preferable that the gains are adjusted, based on an output value of a spectrum from a spectrometer at the different color temperature.

It is preferable that the gains are adjusted, based on the output value of the spectrum from the spectrometer and a standard sensitivity, by calculating an output value of the spectrum at the standard sensitivity and calculating the gains from integral values of the calculated output value.

It is preferable that gains of the camera are adjusted by regulating integral values of an output value of an illumination spectrum at the reference temperature multiplied by spectral sensitivities.

It is preferable that a conversion table or a conversion matrix from the tristimulus values X', Y' and Z' into RGB values is created, based on the output value of the spectrum from the spectrometer.

The present invention provides a color fidelity environment correction method, comprising: an imaging step that photographs an object to be observed with a camera at a reference color temperature using three spectral sensitivities ($S_1(\lambda)$, $S_2(\lambda)$, $S_3(\lambda)$) linearly and equivalently converted from a CIE XYZ color matching function; a spectral sensitivity acquisition step of obtaining 3-band visual sensitivity images as a reference taken with the camera; a step of calculating spectral sensitivities under a condition of a different color temperature from the reference color temperature; a simulated image computation step of calculating gains of 3-band spectral sensitivities of the camera at the different color temperature and adjusting the gains based on color temperature, so as to correct the 3-band visual sensitivity images and compute tristimulus values X', Y' and Z' from the corrected 3-band visual sensitivity images; and a display step of displaying an RGB image taken at a different color temperature with replacement of color based on the corrected tristimulus values X', Y' and Z' or display the RGB image based on the corrected tristimulus values X', Y' and Z' and an RGB image taken at the different color temperature in a comparative manner.

The spectral sensitivities ($S_1(\lambda)$, $S_2(\lambda)$, $S_3(\lambda)$) of the camera are bell-shaped curves that have single peaks and do not take negative values according to the CIE XYZ spectral characteristics, and are obtained by equivalent conversion under the conditions that the respective spectral sensitivity curves have an identical peak value and a minimum overlap. The curve of spectral characteristic S1 has the peak wavelength of 582 nm, the half width of 523 to 629 nm and the $\frac{1}{10}$ width of 491 to 663 nm. The curve of spectral characteristic S2 has the peak wavelength of 543 nm, the half width of 506 to 589 nm and the $\frac{1}{10}$ width of 464 to 632 nm. The curve of spectral characteristic S3 has the peak wavelength of 446 nm, the half width of 423 to 478 nm and the $\frac{1}{10}$ width of 409 to 508 nm.

Displaying herein is, for example, displaying on the screen of a computer and enables the user to clearly understand the appearance and the color of a commercial product.

The image of the invention may be a still image or a moving image. The imaging step, the acquisition step, the computation step and the display step are preferably performed promptly and sequentially.

The reference color temperature is, for example, the color temperature of a xenon lamp as a light source that provides illumination similar to artificial sunlight.

The camera of the invention has the three spectral sensitivities ($S_1(\lambda)$, $S_2(\lambda)$, $S_3(\lambda)$) and photographs an object to be observed with three channels. The technique employed for such imaging may be, for example, an optical filter set to obtain these spectral sensitivities, a dichroic mirror, a dichroic prism.

The color fidelity environment correction apparatus or the color fidelity environment correction method of the invention obtains spectral sensitivities of a reference image that faithfully simulate the human visual sensitivity from an image taken with a camera, performs computer-based temperature correction of the obtained spectral sensitivities and replaces the color of another image displayed on a screen with the color of the reference image.

Advantageous Effects of Invention

A typical application of the color fidelity environment correction apparatus or the color fidelity environment correction method of the invention is simulation by replacement of the color of a commercial product such as motor vehicle in sales of the commercial product. This is convenient for manufacture and sales. Additionally, this makes the color of a commercial product in a location where the commercial product is selected visually approximate to the color of an actually purchased commercial product. This reduces the feeling of strangeness with regard to the color.

BRIEF DESCRIPTION OF DRAWINGS

FIG. 4 is diagrams illustrating specific methods employed to obtain image information using three spectral sensitivities (S1($\lambda$), S2($\lambda$), S3($\lambda$)) according to Embodiment 1 of the invention.

DESCRIPTION OF EMBODIMENTS

Figure 1:
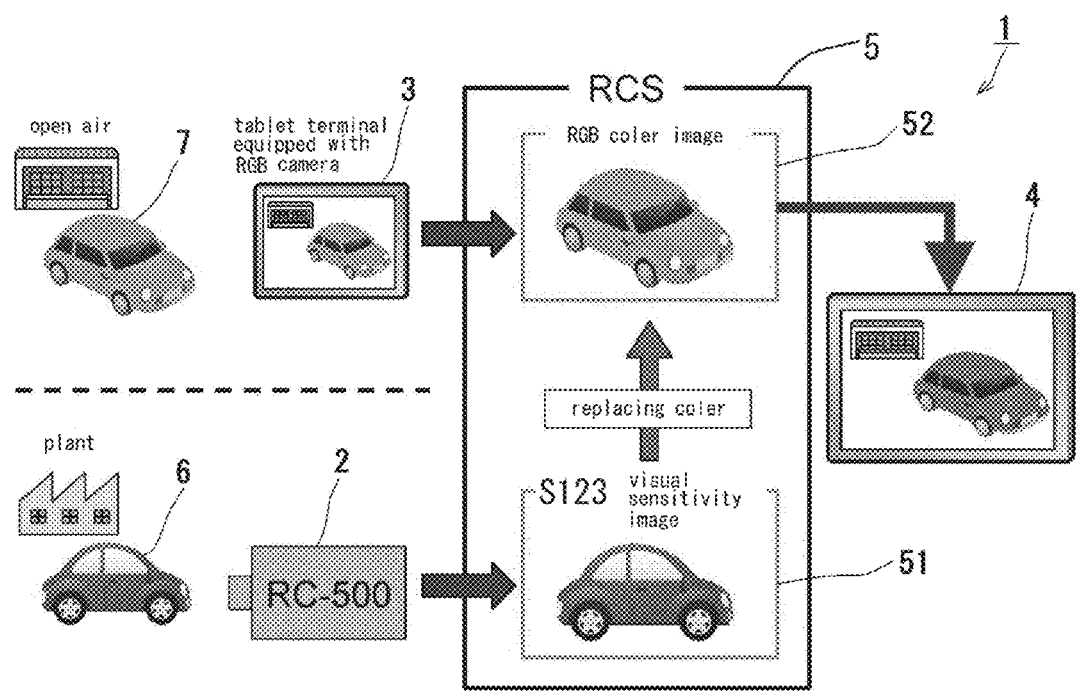
FIG. 1 is a block diagram illustrating a color fidelity environment correction system 1 according to Embodiment 1 of the invention.

FIG. 1 illustrates the general configuration of a real color simulation system (RCS) by a color fidelity environment correction system 1 and the flow of image processing according to Embodiment 1. The color fidelity environment correction system 1 includes a camera 2 and a computer 5 that is connectable with the camera 2, a tablet terminal 3 and a display device 4 and is configured to include a CPU, a ROM, a RAM, a hard disk drive and a bus line. This configuration is applicable to both the case where the tablet terminal 3 and the computer 5 are in a remote location away from the camera 2 and the case where the tablet terminal 3 and the computer 5 are in the same location as the camera 2. The following describes a case of remote location. A red vehicle 6 is photographed with the camera 2 (RC-500 manufactured by PaPaLaB Ltd.) in a local location such as a plant, and 3-band visual sensitivity images S1$i$, S2$i$ and S3$i$ (T=6500 K) ($i$=1 to m, where m represents the number of pixels) are recorded in a storage unit 51 of the computer 5. Another blue vehicle 7 is photographed with the tablet terminal 3 equipped with an RGB camera in the open air as a remote location, and an RGB color image is stored in a storage unit 52. In order to overcome the difference in environment light between T=6500 K in the environment of the local location and T=2900 K in the environment of the remote location and display the accurate color, an RGB color image of the red vehicle is generated by replacing the blue color of the RGB color image of the vehicle 7 with the red color of an XYZ color fidelity image of the vehicle 6 converted from the 3-band visual sensitivity images and is displayed on the display device 4.

Figure 2A:
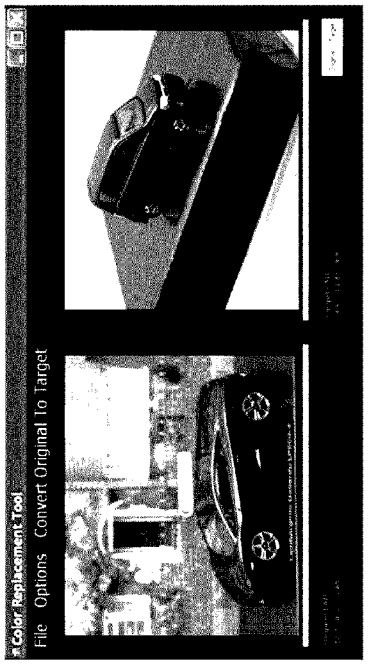
FIG. 2 is diagrams illustrating a practical example by the color fidelity environment correction system 1 according to Embodiment 1 of the invention.
Figure 2B:
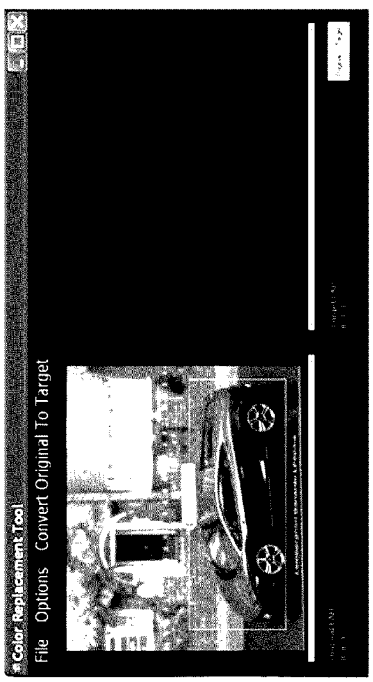
Figure 2C:
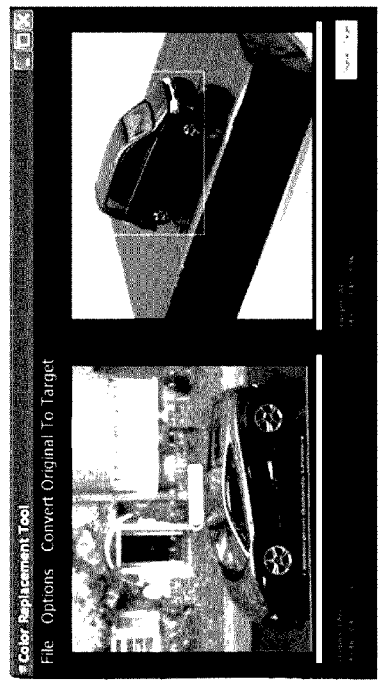

FIG. 2 illustrates an example of screen image on the display device 4 in FIG. 2A to FIG. 2C. In FIG. 2A, display frames are formed on the display screen of the display device 4, and a color image of the vehicle 7 that is the object of color simulation is set in the left frame. The color of the vehicle 7 is blue. In FIG. 2B, a color image of the vehicle 6 that is subjected to color extraction is set in the right frame. In this case, the color of the vehicle 6 is red, and the red color is to be extracted. In FIG. 2C, color simulation of this embodiment is performed to replace the blue color of the vehicle 7 displayed in the left frame with the red color of the vehicle 6 displayed in the right frame. Both the color images of the vehicles 6 and 7 are accordingly displayed as red color images. This provides the environment that reproduces the color of a vehicle that is actually not placed in a car dealer like the color of an actual vehicle. The following describes the configuration and the operations more in detail.

Figure 3:
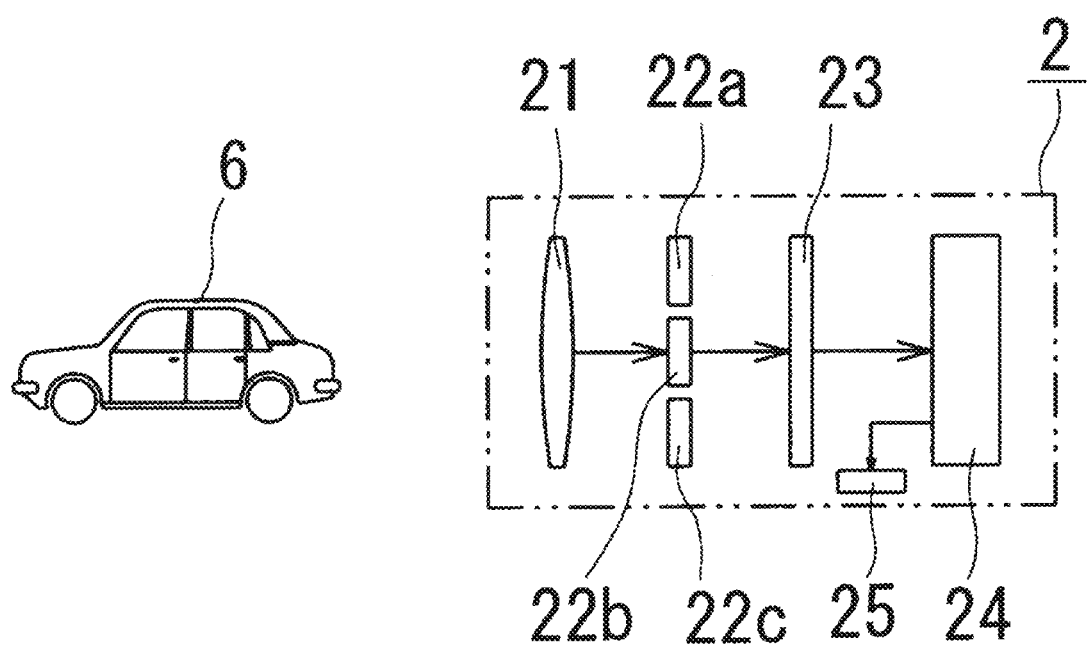
FIG. 3 is a block diagram illustrating a camera 2 included in the color fidelity environment correction system 1 according to Embodiment 1 of the invention.

The camera 2 includes a photographic lens 21, three optical filters 22a, 22b and 22c located behind the photographic lens 21 and an imaging element 23 (for example, CCD or CMOS) located behind the optical filters 22a, 22b and 22c as shown in FIG. 3. Three spectral sensitivities (S1($\lambda$), S2($\lambda$), S3($\lambda$)) of the camera 2 are given as the products of spectral transmittances of the optical filters 22a, 22b and 22c and the spectral sensitivity of the imaging element 23. The positional relationship between the optical filters 22a, 22b and 22c and the imaging element 23 is also schematically illustrated in FIG. 3. The following describes specific methods of obtaining image information using the three spectral sensitivities (S1($\lambda$), S2($\lambda$), S3($\lambda$)). This embodiment may employ any of these methods or may employ another suitable method.

As shown in FIG. 3, the camera 2 includes an arithmetic processing unit 24 that has three spectral sensitivities (S1($\lambda$), S2($\lambda$), S3($\lambda$)) linearly and equivalently converted from a CIE XYZ color matching function and serves to convert three spectral sensitivities of a photographed image into tristimulus values X, Y and Z in a CIE XYZ color system, and an image display unit 25 that serves to display an image.

Figure 4A:
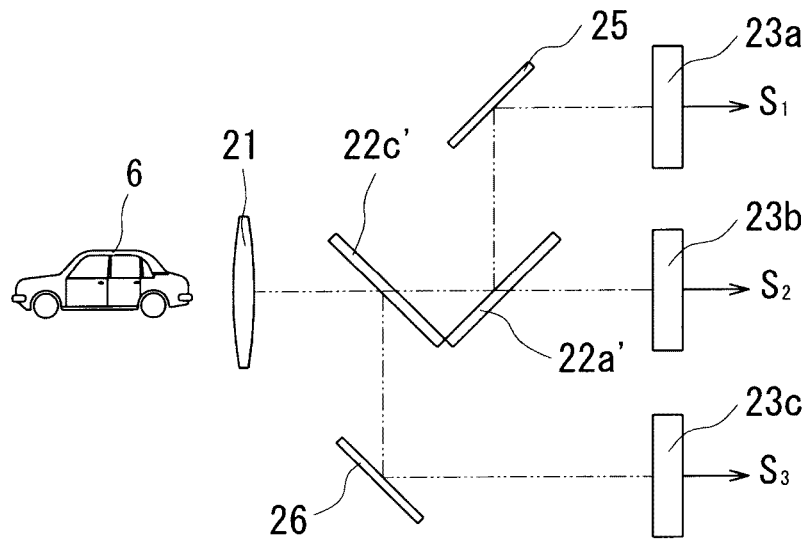
FIG. 4A is a diagram illustrating a method using dichroic mirrors.

FIG. 4A illustrates a method using dichroic mirrors. This method makes light of a specified wavelength reflected by a dichroic mirror 22c', disperses the transmitted light by making light of another specified wavelength reflected by another dichroic mirror 22a', and obtains information from three imaging elements 23a, 23b and 23c arrayed in parallel to one another. In this system, the dichroic mirror 22a' corresponds to the optical filters 22a and 22b, and the dichroic mirror 22c' corresponds to the optical filter 22c. With regard to incident light from a photographic lens 21, light of spectral sensitivity S3 is reflected by the dichroic mirror 22c', and the remaining light is transmitted. The light reflected by the dichroic mirror 22c' is reflected by a reflector 26, and the imaging element 23c provides spectral sensitivity S3. With regard to the light transmitted through the dichroic mirror 22c', light of spectral sensitivity S1 is reflected by the dichroic mirror 22a', and the remaining light of spectral sensitivity S2 is transmitted. The imaging elements 23a and 23b respectively provide spectral sensitivity S1 and spectral sensitivity S2. The dichroic mirrors may be replaced with a dichroic prism having similar characteristics to disperse light into three lights. Imaging elements 23a, 23b and 23c may be applied on the dichroic prism at positions where the respective lights are transmitted.

Figure 4B:
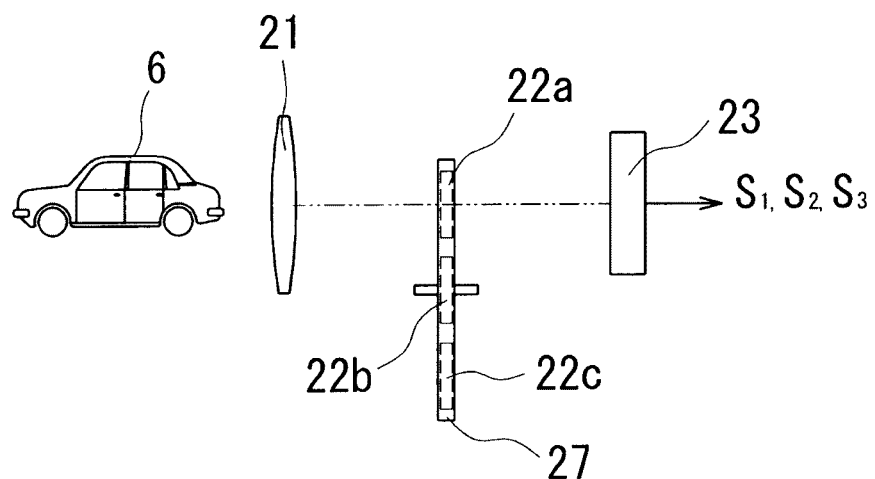
FIG. 4B is a diagram illustrating a method using a filter turret.

FIG. 4B illustrates a method using a filter turret 27. Optical filters 22a, 22b and 22c are provided on the filter turret 27 having an axis of rotation in a direction identical with the direction of incident light from a photographic lens 21 and are mechanically rotated. An imaging element 23 receives the sequentially transmitted lights and provides three spectral sensitivities S1, S2 and S3.

Figure 4C:
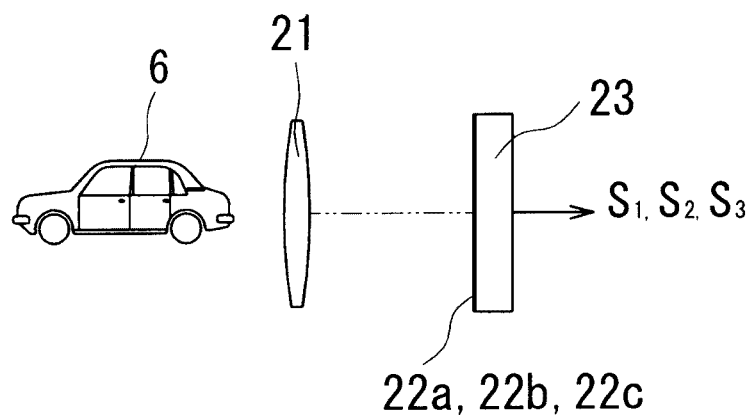
FIG. 4C is a diagram illustrating a method using optical filters 22a, 22b and 22c microscopically applied on an imaging element 23.

FIG. 4C illustrates a method using optical filters 22a, 22b and 22c microscopically applied on an imaging element 23. The optical filters 22a, 22b and 22c are provided in a Bayer array on the imaging element 23. In this array, the optical filer 22b is arranged in half of an upper area on the imaging element 23 in a grid pattern, and the optical filters 22a and 22c are arranged equally in respective halves of the remaining area. Accordingly, the layout ratio of the optical filter 22a:optical filter 22b:optical filter 22c=1:2:1. The array of the optical filters 22a, 22b and 22c is, however, not necessarily limited to the Bayer array according to Embodiment 1. The respective optical filters 22a, 22b and 22c are microscopic and are applied on the imaging element 23 by printing. The invention is, however, not characterized by this array but is characterized by application of filters characteristic of spectral sensitivities (S1($\lambda$), S2($\lambda$), S3($\lambda$)) on an imaging element.

Figure 5:
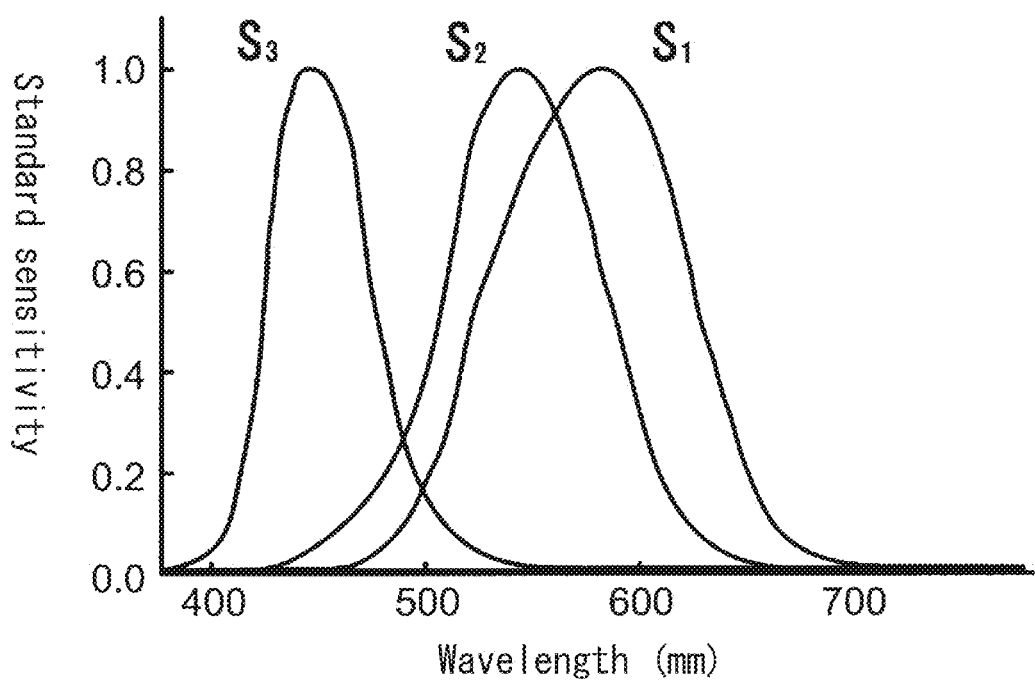
FIG. 5 is a diagram showing a function of spectral sensitivities of the camera 2 that is an XYZ color system camera according to Embodiment 1 of the invention.

The spectral sensitivities of the camera 2 satisfy Luther condition. As shown in FIG. 5, spectral sensitivities (S1($\lambda$), S2($\lambda$), S3($\lambda$)) are converted equivalently from an XYZ color matching function on the conditions that spectral sensitivity curves take no negative values, are bell-shaped curves with single peaks, have an identical peak value and have minimum overlaps. More specifically the spectral sensitivities (S1($\lambda$), S2($\lambda$), S3($\lambda$)) have the following characteristics:

| Peak | Wavelength | Half Width | 1/10 Width |
|------|------------|------------|------------|
| S1 | 582 nm | 523-629 nm | 491-663 nm |
| S2 | 543 nm | 506-589 nm | 464-632 nm |
| S3 | 446 nm | 423-478 nm | 409-508 nm |

The peak wavelength of the spectral characteristic S1 may be regarded as 580±4 nm, the peak wavelength of the spectral characteristic S2 may be regarded as 543±3 nm, and the peak wavelength of the spectral characteristic S3 may be regarded as 446±7 nm.

The three spectral sensitivities (S1($\lambda$), S2($\lambda$), S3($\lambda$)) are calculated according to Expression 1. Refer to JP 2005-257827A for the details of spectral characteristics.

$$\begin{bmatrix} S_1(\lambda) \\ S_2(\lambda) \\ S_3(\lambda) \end{bmatrix} = \begin{bmatrix} 0.51151 & 0.60975 & -0.10930 \\ -0.38668 & 1.16031 & 0.07538 \\ 0.0 & 0.0 & 0.56086 \end{bmatrix} \begin{bmatrix} \bar{x}(\lambda) \\ \bar{y}(\lambda) \\ \bar{z}(\lambda) \end{bmatrix} \quad [\text{Math. 1}]$$

The camera 2 has the arithmetic processing unit 24 that obtains and records 3-band visual sensitivity images S1i, S2i and S3i (T=6500 K) according to the spectral sensitivities (S1($\lambda$), S2($\lambda$), S3($\lambda$)), displays the visualized images on the image display unit 25 and sends the images to the computer 5 via a communication line such as the Internet. Transmission is not limited to the communication line but may be performed by delivery of a storage medium or any other suitable means.

The display device 4 is connected with the computer 5 to receive an image signal processed by the computer 5 and display an image on the screen. The computer 5 or the display device 4 adequately includes input means (not shown) or the like. The input means may be, for example, a keyboard, a mouse or a touch panel provided on an image display device.

Figure 6:
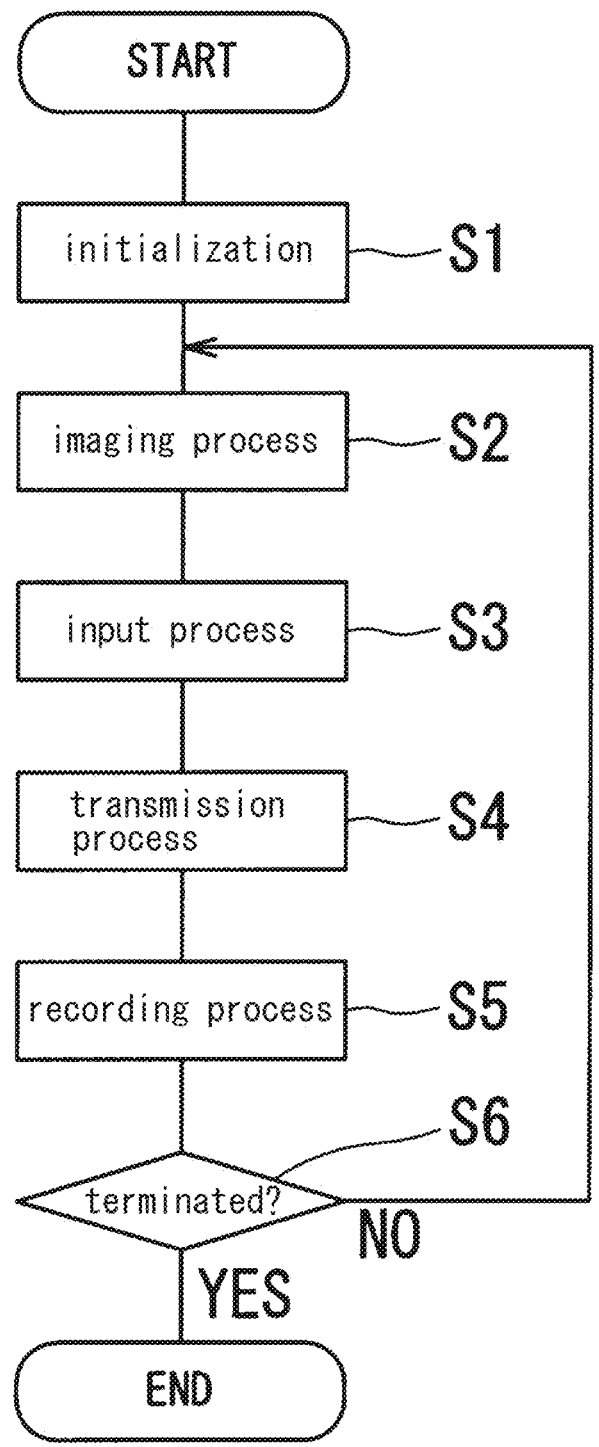
FIG. 6 is a flowchart with regard to the camera 2 according to Embodiment 1 of the invention.

The following describes the configuration and the operations of the color fidelity environment correction system 1 with reference to a concrete example. As shown in FIG. 1, the color fidelity environment correction system 1 operates using the camera 2, the tablet terminal 3, the computer 5 and the display device 4. The connection method is freely selectable whether wireless connection or wired connection. FIG. 6 is a flowchart with regard to the camera 2, and FIG. 7 is a flowchart with regard to the computer 5.

As shown in FIG. 6, when being powered on, the camera 2 in the local location performs initialization (initialization S1). The camera 2 then photographs the vehicle 6 at the spectral sensitivities (S1($\lambda$), S2($\lambda$), S3($\lambda$)) (imaging process S2). The imaging process S2 takes an image of the vehicle 6 with the camera 2 having the three spectral sensitivities (S1($\lambda$), S2($\lambda$), S3($\lambda$)) (shown in FIG. 5). The spectral sensitivities (S1($\lambda$), S2($\lambda$), S3($\lambda$)) are given according to Mathematical Expression 1. A sequential input process S3 is performed concurrently with imaging with the photographic lens 21, the optical filters 22a, 22b and 22c and the imaging element 23.

The 3-band visual sensitivity images S1i, S2i and S3i (T=6500 K) are input by the imaging element 23 (input process S3). The 3-band visual sensitivity images S1i, S2i and S3i (T=6500 K) are sent to the computer 5 by the arithmetic processing unit 24 (transmission process S4) and are recorded in a storage medium of, for example, the camera 2 (recording process S5). The camera 2 then determines whether the processing flow is to be terminated (S6) and terminates the processing flow.

Figure 7:
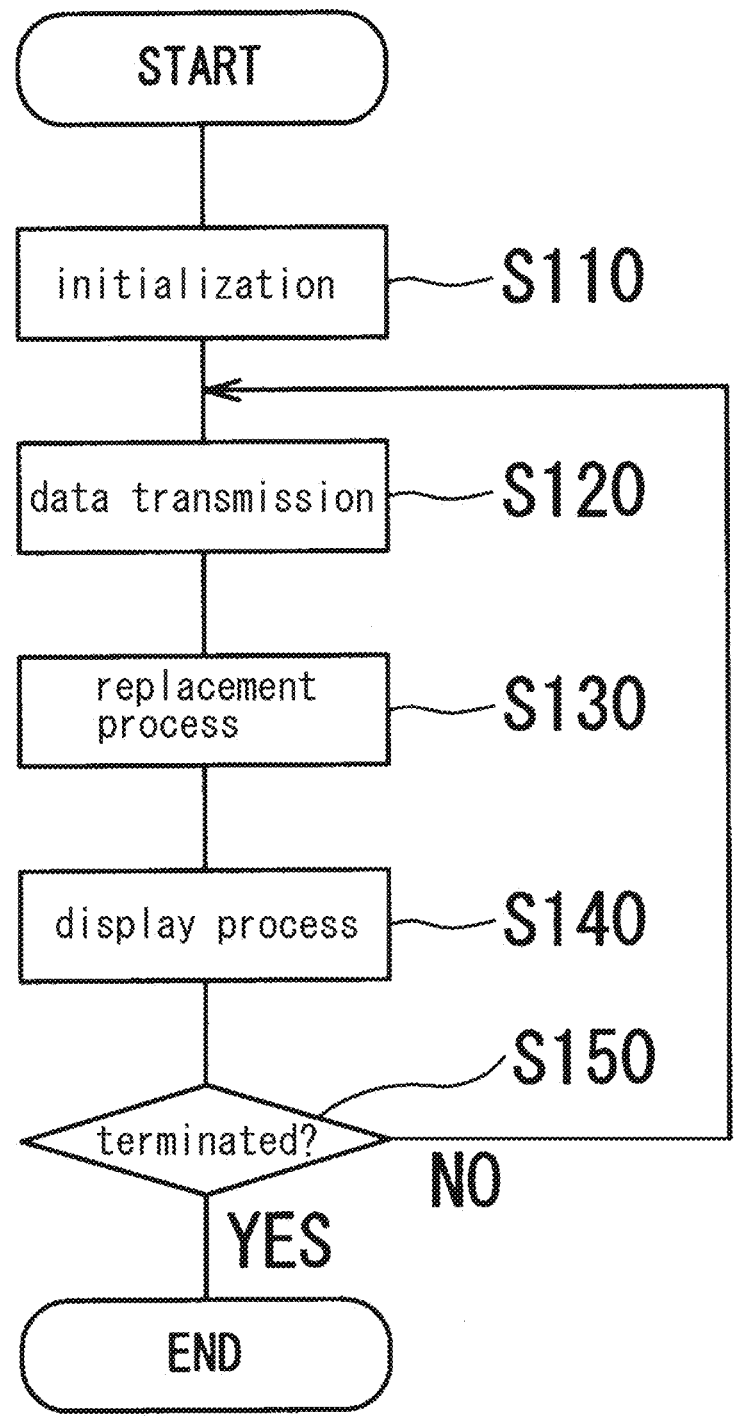
FIG. 7 is a flowchart with regard to a computer 5 in the color fidelity environment correction system 1 according to Embodiment 1 of the invention.

As shown in FIG. 7, when being powered on, the computer 5 in the remote location performs initialization (S110). The computer 5 receives the 3-band visual sensitivity images S1i, S2i and S3i (T=6500 K) sent from the camera 2 and records the received 3-band visual sensitivity images S1i, S2i and S3i into the storage unit 51 (data transmission S120). The computer 5 also receives an RGB color image of the vehicle 7 from the tablet terminal 3 and records the received RGB color image into the storage unit 52 (S120). In the case of a moving image, the series of images is performed sequentially.

The computer 5 subsequently extracts the color of an XYZ color fidelity image based on the XYZ color fidelity image from the camera 2 and the RGB color image from the tablet terminal 3 and replaces the color of the RGB color image with the extracted color (S130). This process is described in detail below.

The XYZ color fidelity image is obtained from the camera 2 as described below. The arithmetic processing unit 24 of the camera 2 converts the received 3-band visual sensitivity images S1i, S2i and S3i (T=6500 K) into tristimulus values X, Y and Z with performing temperature correction with regard to each pixel. XYZ conversion is generally performed by mathematical Expression 2, but XYZ conversion with temperature correction herein is performed according to Expression 3. The tristimulus values X, Y and Z of the XYZ color fidelity image are corrected to tristimulus values X', Y' and Z' as shown by Expression 3. An image is replaced with these corrected values.

$$\begin{bmatrix} X \\ Y \\ Z \end{bmatrix} = \begin{bmatrix} A_{11} & A_{12} & A_{13} \\ A_{21} & A_{22} & A_{23} \\ A_{31} & A_{32} & A_{33} \end{bmatrix} \begin{bmatrix} S1 \\ S2 \\ S3 \end{bmatrix}$$ [Math. 2]

$$\begin{bmatrix} X' \\ Y' \\ Z' \end{bmatrix} = \begin{bmatrix} A_{11} & A_{12} & A_{13} \\ A_{21} & A_{22} & A_{23} \\ A_{31} & A_{32} & A_{33} \end{bmatrix} \begin{bmatrix} S1 \times S1 \text{ gain} \\ S2 \\ S3 \times S3 \text{ gain} \end{bmatrix}$$ [Math. 3]

This corrects imaging of the vehicle 7 in the evening in the open air and imaging of the vehicle 6 under a xenon lamp in a plant, based on the relationship to the color temperature.

Figure 8:
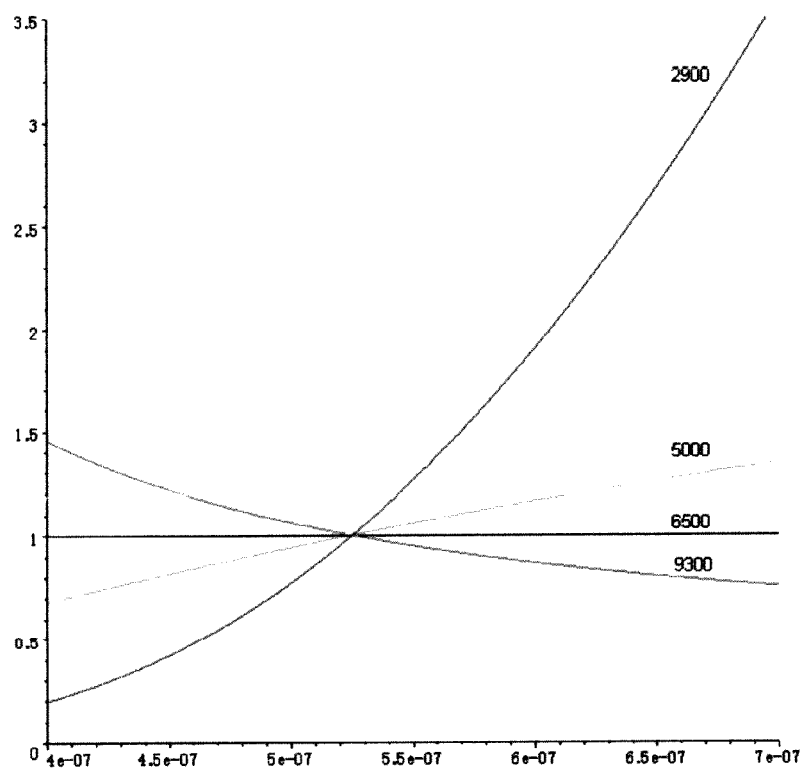
FIG. 8 is a graph showing relationship between relative intensity of spectrum of black body radiation and color temperature (reference color temperature of 6500 K)

According to the Planck's law with regard to heat radiation, the relationship between spectral intensity I and absolute temperature t (K: Kelvin; K) is computed with normalization of the maximum value of intensity to 1 as shown in FIG. 8. FIG. 8 shows the wavelength (λ) in the unit of meter (m) as abscissa and the relative intensity of spectrum as ordinate with numerical values indicating the absolute temperature (K). The wavelength (λ) of visible light is generally 0.4 μm to 0.8 μm. Red color (R) corresponds to the wavelength of 0.675 μm, green color (G) corresponds to the wavelength of 0.525 μm, and blue color (B) corresponds to the wavelength of 0.475 μm. In Embodiment 1, black body radiation at a certain temperature is defined as white light at the temperature, and the temperature of black body radiation determined from the spectral distribution of white light is defined as color temperature. The relative intensities of three primary colors (RGB) are thus computable from the color temperature.

In daytime, the color temperature of natural light corresponds to 6500 K. This means that light from the sun right above the head is equivalent to the absolute temperature of 6500 K in conversion to black body radiation. Imaging under a xenon lamp in a plant intends to reproduce the natural light in daytime and has color temperature of 6500 K. When the sun slightly goes down, light from the sun passes through the layer of atmosphere by a longer distance and accordingly has the decreased color temperature of 5000 K. In the evening, the color temperature further decreases to about 2900 K.

The natural light in daytime at a color temperature is assumed to white color since the natural light in daytime includes all the color corresponding to the visible light having the wavelength (λ) of 0.4 μm to 0.7 μm. The spectral intensity is calculated, based on the white color set to a reference value 1.

Figure 9:
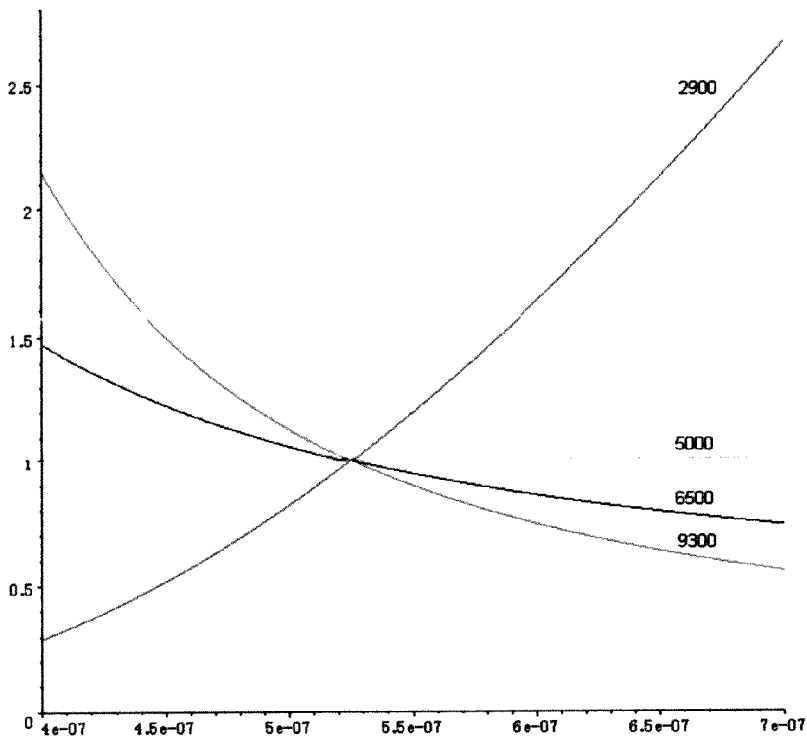
FIG. 9 is a graph showing relationship between relative intensity of spectrum of black body radiation and color temperature (reference color temperature of 5000 K)

Computation with normalization of the value at the wavelength of 0.525 μm to 1 by setting the spectrum having the color temperature of 5000 K to the basis of white color gives the relationship between the color temperature and the spectral intensity shown in FIG. 9. FIG. 9 shows the relationship between the relative intensity of spectrum of black body radiation and the color temperature (reference color temperature of 5000 K) with the wavelength (λ) in the unit of meter (m) as abscissa, the relative intensity of spectrum as ordinate and numerical values indicating the absolute temperature (K). The results of computation show the color changes to reddish with a decrease in color temperature and changes to bluish and greenish with an increase in color temperature. This indicates the quantitative relationship between the color temperature of illumination light and the three primary colors (R, G and B). The luminance of RGB is adjusted to change the color temperature, based on the results of computation. Accordingly, an image in the evening at the color temperature of 2900 K is obtainable from an image in the plant at the color temperature of 6500 K. As described above, the accurate color similar to the human visual sense is reproduced by computation fitting to the color temperature.

In an example described herein, 3-band visual sensitivity images S1i, S2i and S3i (T=6500 K) obtained by irradiating the vehicle 6 with a xenon lamp having the color temperature of 6500 K (D65) in the plant are converted to 3-band visual sensitivity images S1i2900 K, S2i2900 K and S3i2900 K (T=2900 K) observed with the evening sun (color temperature of 2900 K) in the open air.

Figure 11:
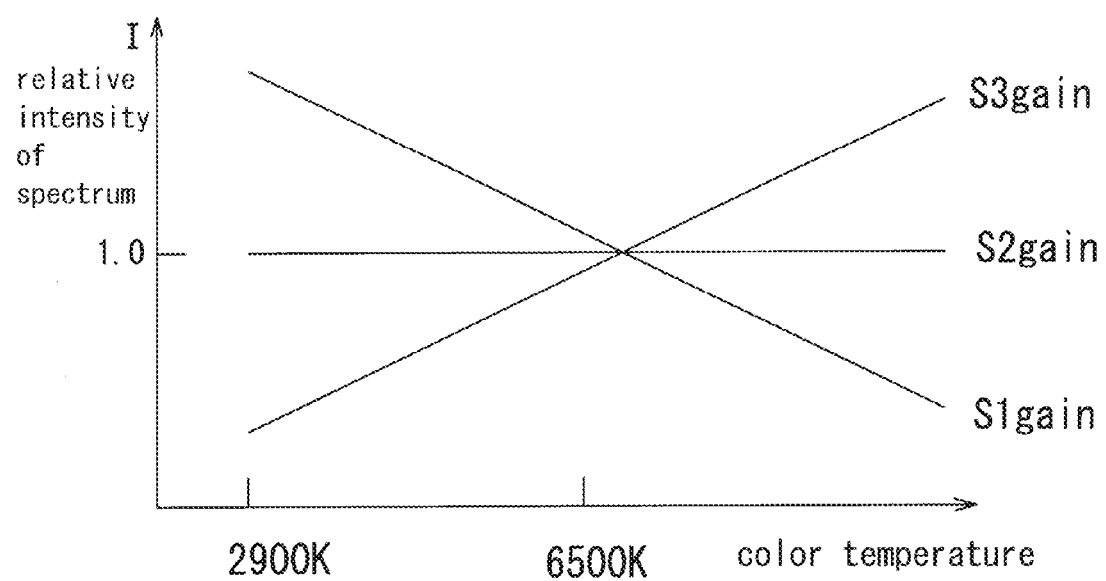
FIG. 11 is a graph showing relationship between relative intensity of spectrum and color temperature with regard to the three spectral sensitivities according to Embodiment 1 of the invention.

Expression 3 is used for conversion from the values at 6500 K as the basis to those at 2900 K. Relative to the values at the color temperature of 6500 K as the basis, as shown in FIG. 11, the illumination light at the color temperature of 2900 K has a blue color component with decreasing the short wavelength component and increasing the long wavelength component. Quantification of another color temperature relative to the color temperature of 6500 K set to 1 provides the illustrated color wavelength distribution at 2900 K.

Figure 10:
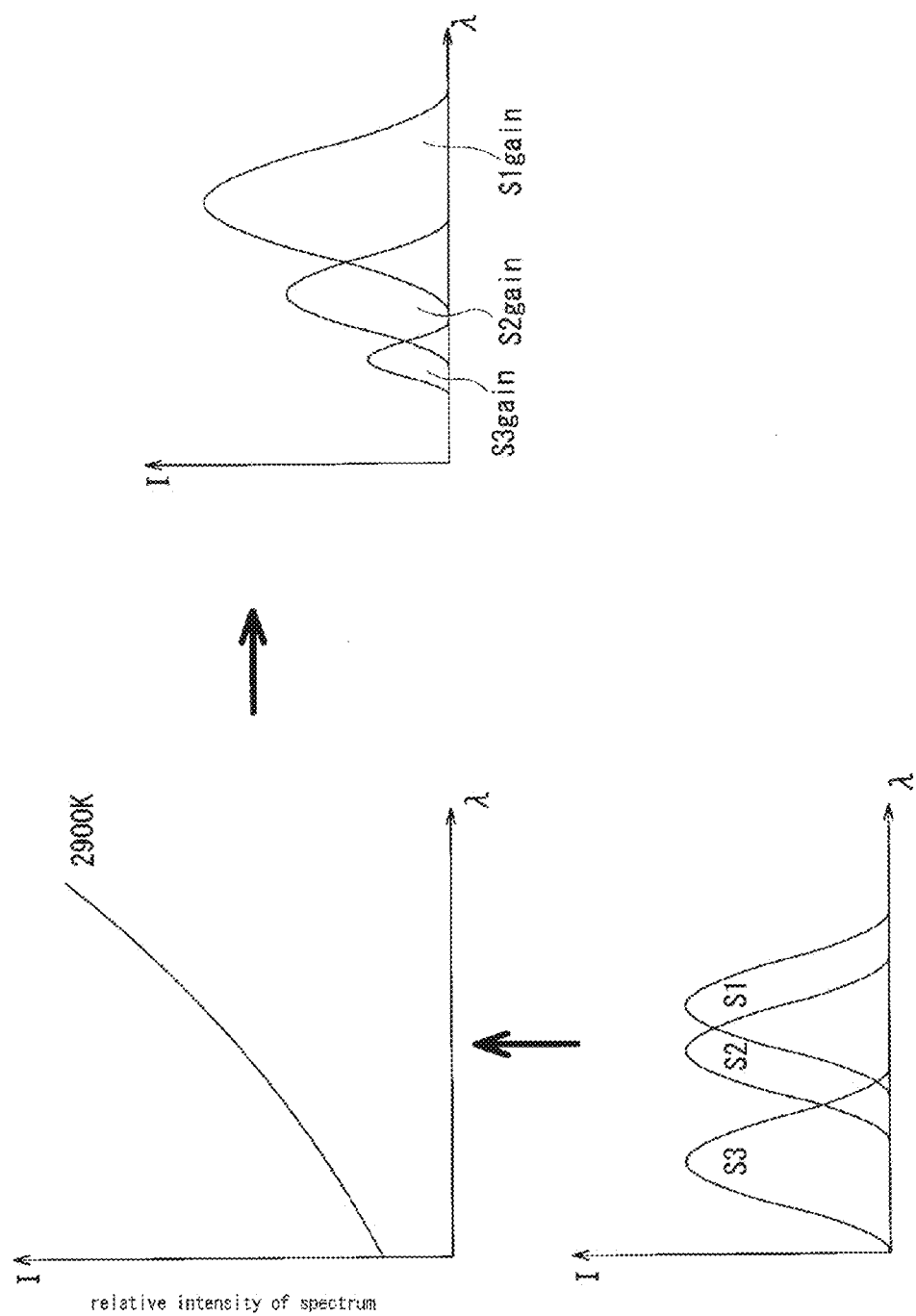
FIG. 10 is graphs showing relations of the spectral sensitivities according to Embodiment 1 of the invention to relative intensity of spectrum and spectral sensitivity gains.

Relative spectral gains S1gain, S2gain and S3gain (T=2900 K) shown in FIG. 10 denote relative ratios of integral values representing the areas of illumination spectra S1, S2 and S3 at T=2900 K in an optical spectrum characteristic curve (where S2gain is set to 1). This computation is based on the relational expression of black body radiation. This relational expression provides completely determined values as shown in FIG. 8. In FIG. 8 (reference color temperature of 6500 K) and FIG. 9 (reference color temperature of 5000 K), the abscissa shows the wavelength (λm) and the ordinate shows the relative intensity of spectrum. The gains of the camera 2 are adjusted such as to align the peaks of the three relative spectral gains S1gain, S2gain and S3gain (T=2900 K) under illumination of the color temperature of 6500 K as shown in FIG. 11 according to the relational expression of FIG. 8 (as shown in FIGS. 10 and 11). This example is based on the reference temperature of 6500 K. In the case of another reference temperature, for example, at the reference temperature of 5000 K, FIG. 9 should be employed in place of FIG. 8.

As shown in FIG. 10, at the color temperature of 2900 K, the relative intensity I of spectrum of illumination light provides a rising curve against the wavelength 2. The relative intensity of spectrum increases with an increase in wavelength 2. As shown in the right graph of FIG. 10, the respective gains S1gain, S2gain and S3gain are varied according to the relative intensity I of spectrum to provide distributions of the higher peaks and the larger areas at the higher wavelengths. This leads to changes of the original gains. These gains should thus be calculated according to a change in color temperature. In response to a change of illumination from the color temperature 6500 K to the color temperatureb 2900 K, the spectral sensitivity S3 of the camera 2 decreases, while the spectral sensitivity S1 of the camera 2 increases. The relative intensities of the spectral sensitivities S1 and S3 are calculated on the basis of the spectral sensitivity S2. A graph as shown in FIG. 11 is created in advance for calculation of the spectral sensitivities with regard to each color temperature. The values of the spectral sensitivities S1, S2 and S3 in the case of photographing the vehicle 6 at the color temperature 6500 K (D65) are computed by calculating the gains S1gain and S3gain at 2900 K and correcting Expression 3 given above with the calculated gains. The 3-band visual sensitivity images S1$i$, S2$i$ and S3$i$ (T=6500 K) are converted to 3-band visual sensitivity images S1$i$2900k, S2$i$2900k and S3$i$2900k. This provides tristimulus values X', Y' and Z' and allows for replacement with accurate color values. Accordingly an accurate RGB color image of the vehicle 7 is displayed on the display device 4.

The computer 5 performs XYZ-RGB conversion based on the corrected tristimulus values X', Y' and Z' to replace the color data of the RGB image taken with the tablet terminal (S130).

The replaced RGB color image is displayed on the display device 4 (S140). The computer 5 then determines whether the processing is to be terminated or not. When the processing is not to be terminated, the processing flow goes back to S120. When the processing is to be terminated, the processing flow goes to Return.

As described above, the color data of the XYZ color fidelity image of the vehicle 6 under the xenon lamp in the plant is replaced with the color data of the RGB image taken in the evening in the open air. Accordingly the color of the red vehicle 7 that is equivalent to the image taken in the evening in the open air is displayed on the display device 4. In the case of photographing in the middle of the day in the open air, the calculation is performed with correction to the higher color temperature of 8000 K to 9000 K. The user's desired color of the vehicle 7 is thus freely displayed on the screen according to the adequate color temperature irrespective of the change of the climate condition, such as the morning, afternoon or cloudy day.

The colors of the actual vehicle placed in the car dealer are limited, and the user is unlikely to directly see many colors of the vehicle. The color fidelity technique, however, allows for accurate reproduction of such colors. Vehicles coated with various different colors are photographed in advance in the plant. The color of an RGB color image may be replaced on the basis of imaging data of these plurality of XYZ color fidelity images, accompanied with correction of the environment according to the color temperature.

Color replacement is based on imaging of the actual vehicles 6 and 7. This provides the reality and is advantageous for the user. This reflects the climate condition and allows the user to accurately see the color of the image under a different condition in a location where the user is located.

The color fidelity color simulation system 1 having the above characteristics replaces the color of an RGB color image based on the color data of XYZ color fidelity images and provides the highly accurate color fidelity with taking into account the color temperature. This is convenient for both the car makers and the users is available for various applications other than vehicles, for example, the colors of articles of furniture, interior items, clothing items, buildings and other general purposes.

Figure 12:
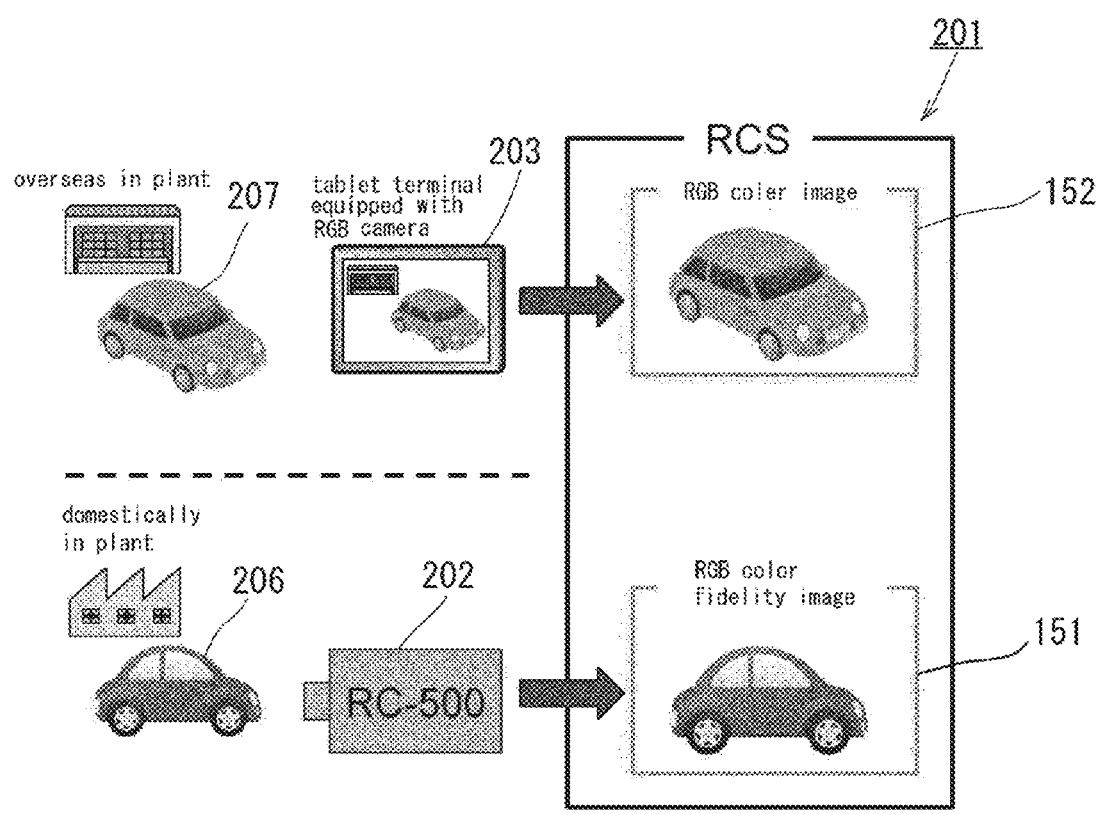
FIG. 12 is a block diagram illustrating a color fidelity environment correction system 201 according to Embodiment 2 of the invention.

The color fidelity environment correction system 1 of Embodiment 1 computes temperature correction of color data based on the data of black body radiation and replaces images. As shown in FIG. 12, a color fidelity environment correction system 201 of Embodiment 2 compares the colors of a vehicle 206 that is a reference product produced domestically in a local location and a vehicle 207 produced overseas in a remote location and performs color matching. For the purpose of description, it is assumed that the environment color temperature in the local location is T=6500 K and that the environment color temperature in the remote location is T=5000 K. This embodiment uses observed values of a micro-spectrometer 228, and the color temperature is not specifically involved in simulation. This embodiment, however, performs correction based on the temperature difference with a view to enhancing the accuracy of color data. Embodiment 2 differs from Embodiment 1 by a configuration using a personal digital assistant 203 (tablet terminal equipped with an RGB color system camera) in the remote location and a spectrometer 228 (small-size spectrometer such as micro-spectrometer) that is connectable with the personal digital assistant 203. The different configuration of Embodiment 2 from Embodiment 1 is described with reference to FIGS. 12 to 18. The other configuration of the color fidelity environment correction system 201 of Embodiment 2 is substantially similar to that of Embodiment 1 and is not specifically described here.

Embodiment 1 uses the color temperature specified by the physical expression in computer simulation. Embodiment 2 uses color temperatures of actual illuminations measured by the spectrometer 228. Although these spectra are not necessarily consistent with one another (Shikisai-Kogaku (Color Engineering), Tokyo Denki University Press), the color temperatures are defined by using isotemperature lines and are used. S1gain and S3gain are not only calculated from the spectral sensitivities S1, S2 and S3 of black body radiation according to the color temperature but are calculated from three numerical values of illumination lights in the local location and in the remote location, which are obtained by multiplying the spectral sensitivities S1, S2 and S3 by the spectra of illuminations measured in the local location and in the remote location. This embodiment uses an ideal spectrum according to the color temperature and observed spectra arbitrarily selected in both the local location and the remote location. This embodiment is characteristic of determining the ratio of spectral characteristic S123 of illumination in the local location to spectral characteristic S123 of illumination in the remote location.

Figure 13:
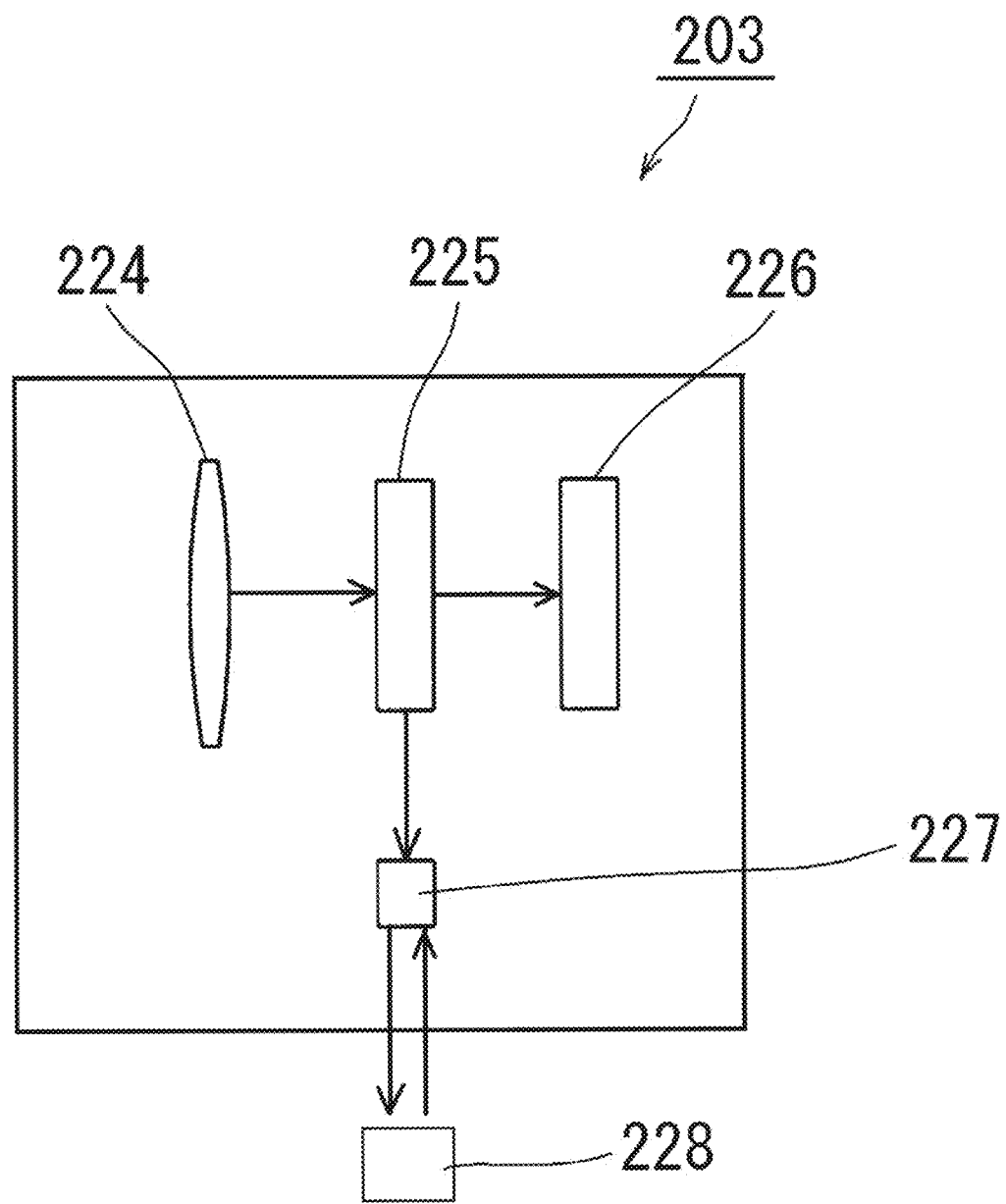
FIG. 13 is a block diagram illustrating a personal digital assistant and a spectroscope according to Embodiment 2 of the invention.

The personal digital assistant 203 is, for example, a smartphone or a tablet terminal and is an integrated product of an RGB digital camera 224 with lens, an arithmetic unit 225 including a CPU, a ROM and a RAM, an input-output unit 226 and a display device 227 in the RGB color system as shown in FIG. 13. The personal digital assistant 203 is connectable with the spectrometer 228 by a cable. The arithmetic unit 225 obtains rgb values of an image taken with the RGB digital camera 224. The arithmetic unit 225 also performs temperature correction of 3-band visual sensitivity images S1$i$, S2$i$ and S3$i$ (T=6500 K) of the vehicle 206 sent to the overseas via the Internet from T=6500 K to T=5000 K and computes and visualizes the image data. The personal digital assistant 203 may be replaced by a personal computer.

An example of the micro-spectrometer 228 is C12666MA manufactured by Hamamatsu Photonics K.K. This is a fingertip-size microminiature spectroscopic head produced by merging the MEMS technology and the image sensor technology and has the sensitive wavelength range of 340 to 780 nm and the wavelength resolution of 15 nm max. A spectral sensitivity characteristic, i.e., relative sensitivities (%) that are output values of the spectrum to the wavelengths in the sensitive wavelength range, is obtained by photographing an object with the micro spectrometer 228.

Figure 14:
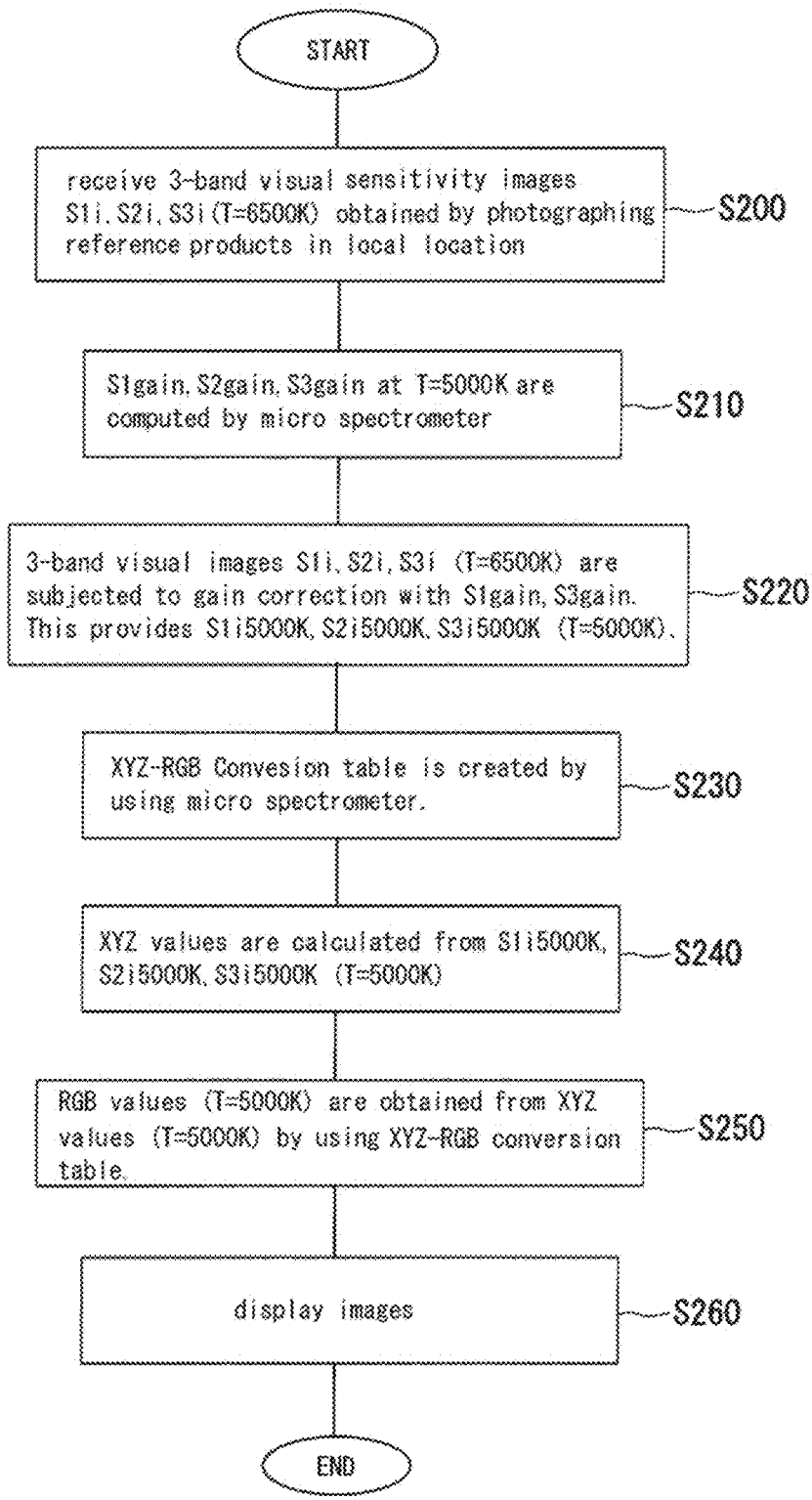
FIG. 14 is a flowchart showing a processing flow performed in an electronic circuit of the personal digital assistant according to Embodiment 2 of the invention.
Figure 15:
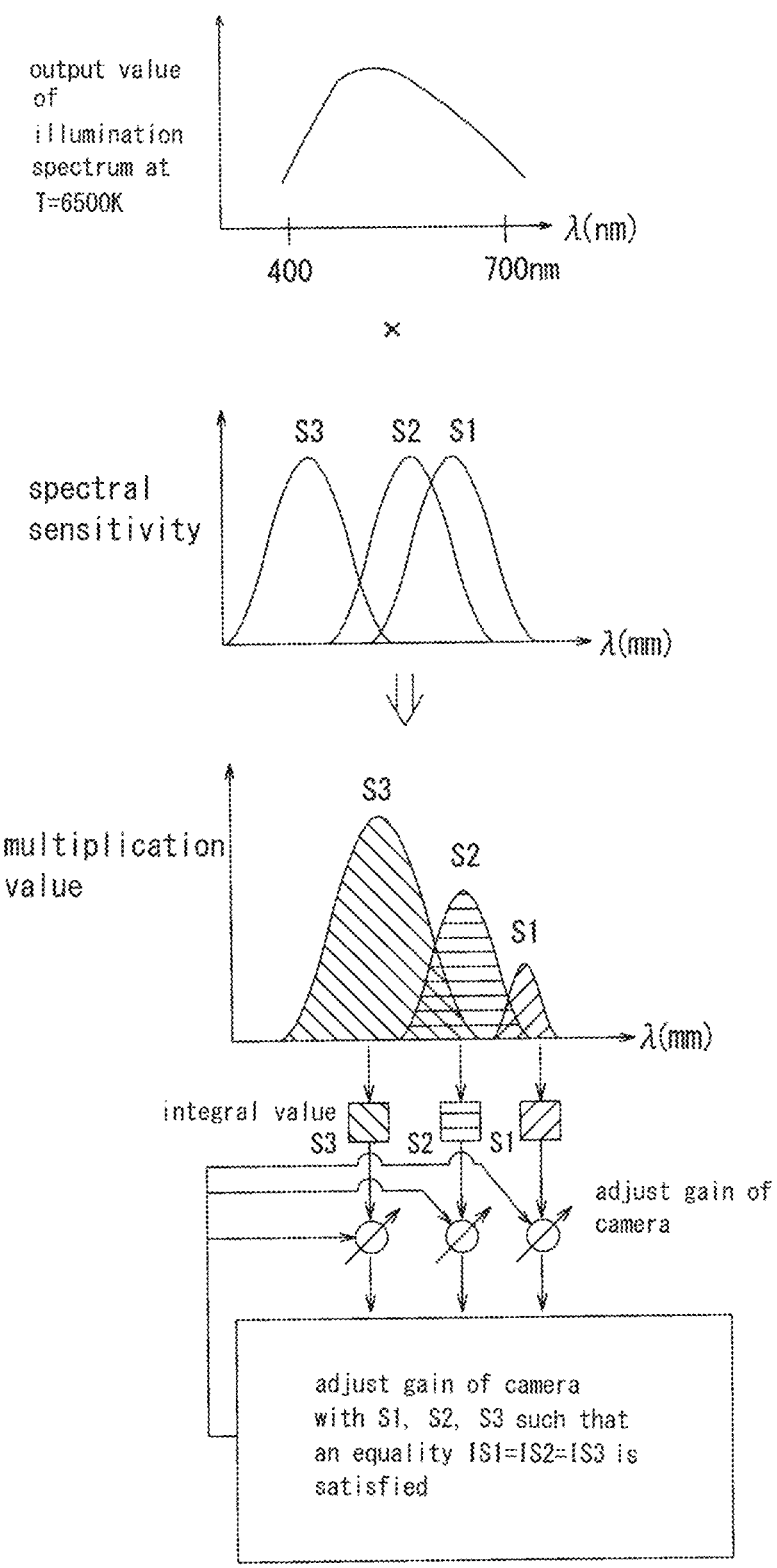
FIG. 15 is a diagram illustrating a process performed in an electronic circuit of a computer in a local location according to Embodiment 2.

A series of processing performed by the personal digital assistant 203 is described with reference to FIG. 14. At S200, 3-band visual sensitivity images S1$i$, S2$i$ and S3$i$ (T=6500 K) obtained by photographing the vehicle 206 in the local location with the camera 202 from the local location are received by the remote location. As shown in FIG. 15, in the local location, the output values of the illumination spectrum at T=6500K are multiplied by the spectral sensitivities S1, S2 and S3 (refer to Math. 1 and FIG. 5) to obtain multiplication values S1, S2 and S3 as indicated with hatched lines and the calculated values are integrated to obtain integral values IS1, IS2 and IS3 within a curved range indicated with hatched lines. Then, the standard sensitivities of the camera 202 are provided by adjusting the gains of the camera 202 (refer to FIG. 12) such that an equality IS1=IS2=IS3 is satisfied.

Figure 16:
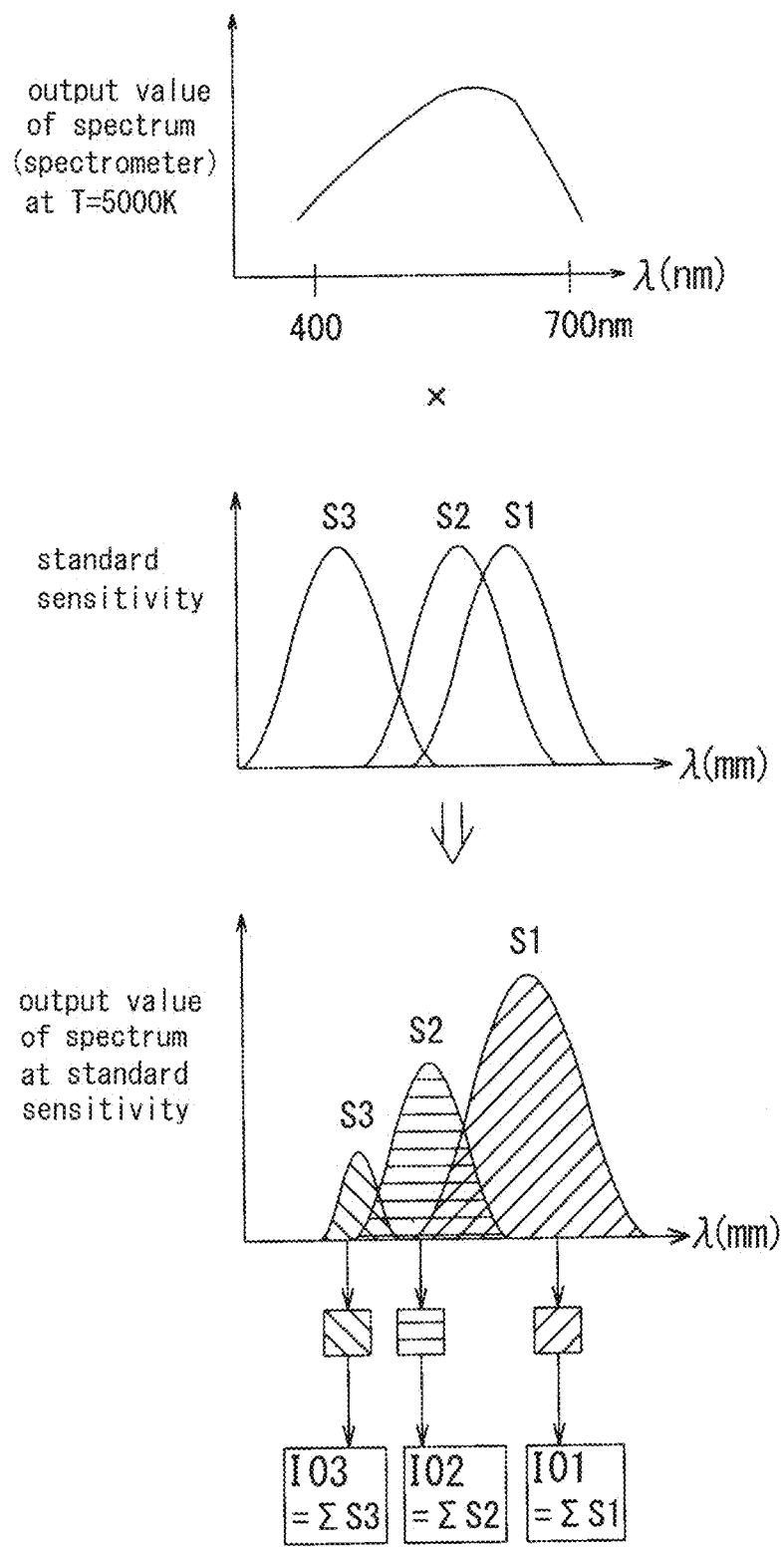
FIG. 16 is a diagram illustrating a process performed in the electric circuit of the personal digital assistant in a remote location according to Embodiment 2.

At S210, S1gain, S2gain (set to 1 as the relative value) and S3gain at T=5000 K are computed by the micro spectrometer 228 in the remote location. As shown in FIG. 16, the output values of the illumination spectrum at T=5000 K (5000 K is illustrative and another temperature may be possible) in the remote location are multiplied by the standard sensitivities S1, S2 and S3 (refer to Math. 1 and FIG. 5) and the calculated values are integrated to obtain integral values I03, I02, I01 within a curved range indicated with hatched lines, so as to evaluate S1gain=I0/I02 and S3gain=I03/I02.

At S220, the 3-band visual sensitivity images S1$i$, S2$i$ and S3$i$ (T=6500 K) received at S200 are subjected to gain correction with S1gain and S3gain computed at S210. This provides 3-band visual sensitivity images S1$i$5000k, S2$i$5000k (equal to S2$i$) and S3$i$5000k (T=5000 K). This computation is similar to the computation by Mathematical Expression 3 of Embodiment 1 (as shown in FIGS. 17 and 18).

At S230, an image displayed on the screen of the display device 227 of the personal digital assistant 203 is captured by pressing a light entering part (slit) of the micro spectrometer 228 on the image, and a conversion table (conversion matrix) for conversion from XYZ values to RGB values is created by mapping R data (for example, R=255:8 bits) to Xr, Yr and Zr, G data to Xg, Yg and Zg and B data to Xb, Yb and Zb. This process aims to input the environment light in the remote location via the spectrometer 228 into the personal digital assistant 203 and cause the spectrum of the environment light in the remote location to be accurately reflected on the XYZ-RGB conversion in the spectrometer 228. The spectrometer 228 displays the R, G and B data and obtains R, G and B spectra. This specifies XR, YR and ZR with regard to R, XG, YG, ZG with regard to G and XB, YB and ZB with regard to B and thereby creates the conversion table from XYZ to RGB. The process of step S230 may be performed in advance and programmed.

At S240, accurate XYZ values (T=5000K) of the respective images at 0 K are calculated from S1$i$5000$k$ S2$i$5000$k$ and S3$i$5000$k$ (i=1 to m, m denotes the number of pixels) that are obtained by multiplication of the relative spectral gains S1gain, S2gain and S3gain (5000 K) computed at S220. The XYZ values are calculated by Mathematical Expression 2 of Embodiment 1 described above.

At S250, RGB values (T=5000K) are obtained from the XYZ values (T=5000K) calculated at S240 by using the XYZ-RGB conversion table. Refer to the description of Embodiment 1 for the details. The correction of the color temperature described above enables an accurate image to be displayed on the RGB monitor.

At S260, an RGB image is displayed on the display device 227, based on the RGB values (T=5000 K) obtained at S250. The image of the vehicle 207 taken with the camera 224 of the personal digital assistant 203 may be displayed in an adjacent image area. This enables two images, i.e., an image 151 of a reference product produced domestically and an image 152 of a comparative product produced overseas, to be compared with each other on the screen of the display device 227 and thereby allows for real time color matching.

This has a potential for various applications. One application may extract vehicles at random from manufactured vehicles 207, measures whether the coating of each extracted vehicle is adequate, and performs color examination of coating or the like. Another application may cause the workers in a plant, for example, in Thailand, to visually check and confirm whether the color of shoes that are to be manufactured in the plant is consistent with the color of original shoes created by a designer and placed in the head office in Japan. Yet another application may photograph tiles in a plant in Japan and enable data of the tiles to be visually checked in real time on the personal digital assistant 203 in the environment of sunlight spectrum in California.

The invention is not limited to the above embodiments but various modifications may be made to the embodiments without departing from the scope of the invention. Such modifications as well as their equivalents are also included in the scope of the invention. The invention may be implemented by various aspects within the scope of the invention. The methods of obtaining image information according to 3-band visual sensitivity images S1$i$, S2$i$ and S3$i$ described in the above embodiments are only illustrative and are not restrictive. The technical feature of the invention is achieved by any other suitable method.

INDUSTRIAL APPLICABILITY

The invention provides simulation by replacement of the color of a commercial product such as motor vehicle in sales of the commercial product or by comparative display. This is convenient for manufacture and sales. Additionally, the invention makes the color of a commercial product in a location where the commercial product is selected visually approximate to the color of an actually purchased commercial product. This reduces the feeling of strangeness with regard to the color and accordingly has a significant potential in industry.

The invention claimed is:

1. A color fidelity environment correction apparatus, comprising:
   a camera that is configured to have three spectral sensitivities ($S_1(\lambda)$, $S_2(\lambda)$, $S_3(\lambda)$) linearly and equivalently converted from a CIE XYZ color matching function;
   a simulation image computation unit that is configured to obtain 3-band visual sensitivity images as a reference by photographing an object to be observed with the camera at a reference color temperature, calculate simulation values by integration of a spectrum of illumination light and three spectral sensitivities of the camera under a condition of a different color temperature from the reference color temperature, and calculate adjustment values of gains from the simulation values, based on a ratio of output values of 3 bands obtained by directly measuring a light source of the reference color temperature with the camera, so as to correct the 3-band visual sensitivity images and compute tristimulus values X', Y' and Z' from the corrected 3-band visual sensitivity images; and
   a display device that is configured to display an RGB image taken at a different color temperature with replacement of color based on the corrected tristimulus values X', Y' and Z' or display the RGB image based on the corrected tristimulus values X', Y' and Z' and an RGB image taken at the different color temperature in a comparative manner.

2. The color fidelity environment correction apparatus according to claim 1, wherein the gains are adjusted according to a relational expression between wavelength of black body radiation and relative intensity of a spectrum at the color temperature.

3. The color fidelity environment correction apparatus according to claim 1, wherein the gains are adjusted, based on an output value of a spectrum from a spectrometer of the illumination light at the different color temperature, by computing changes in output gains of the camera at the different color temperature from a change in ratio of the output values of the 3 bands in the simulation and multiplying the 3-band visual sensitivity images as the reference by the ratio of the output values of the 3 bands.

4. The color fidelity environment correction apparatus according to claim 3, wherein the gains are adjusted, based on the output value of the spectrum from the spectrometer and a standard sensitivity, by calculating an output value of the spectrum at the standard sensitivity and calculating the gains from integral values of the calculated output value.

5. The color fidelity environment correction apparatus according to claim 1, wherein gains of the camera are adjusted by regulating integral values of an output value of an illumination spectrum at the reference temperature multiplied by spectral sensitivities.

6. The color fidelity environment correction apparatus according to claim 1, wherein a conversion table or a conversion matrix from the tristimulus values X', Y' and Z' into RGB values is created, based on the output value of the spectrum from the spectrometer.

7. A color fidelity environment correction method, comprising:

an imaging step that photographs an object to be observed with a camera at a reference color temperature using three spectral sensitivities ($S_1(\lambda)$, $S_2(\lambda)$, $S_3(\lambda)$) linearly and equivalently converted from a CIE XYZ color matching function;

a spectral sensitivity acquisition step of obtaining 3-band visual sensitivity images as a reference taken with the camera;

a step of calculating simulation values by integration of a spectrum of illumination light and three spectral sensitivities of the camera under a condition of a different color temperature from the reference color temperature, and calculating adjustment values of gains from the simulation values, based on a ratio of output values of 3 bands obtained by directly measuring a light source of the reference color temperature with the camera;

a simulated image computation step of correcting the 3-band visual sensitivity images with the calculated adjustment values of the gains and computing tristimulus values X', Y' and Z' from the corrected 3-band visual sensitivity images; and a display step of displaying an RGB image taken at a different color temperature with replacement of color based on the corrected tristimulus values X', Y' and Z' or display the RGB image based on the corrected tristimulus values X', Y' and Z' and an RGB image taken at the different color temperature in a comparative manner.

* * * * *